July 2, 1963
G. RUNKEN
3,095,830
LADING BRACING ARRANGEMENT
Filed July 6, 1960
6 Sheets-Sheet 2
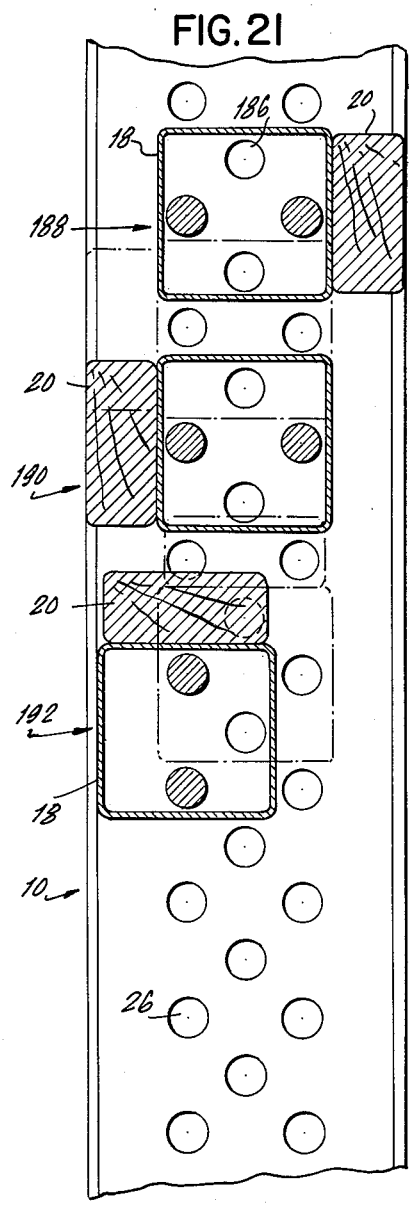
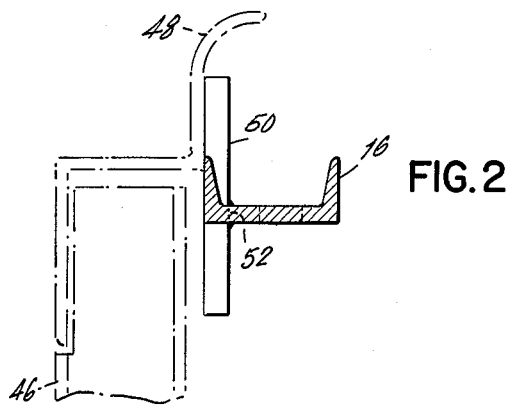
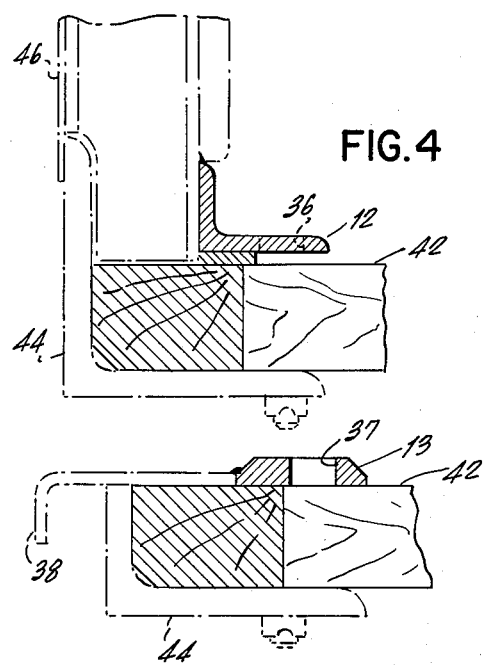
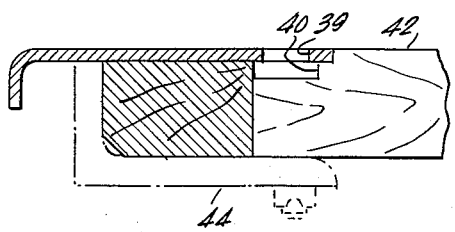
INVENTOR.
GERD RUNKEN
BY
Robert A. Shields
ATTORNEY July 2, 1963  G. RUNKEN  3,095,830
LADING BRACING ARRANGEMENT
Filed July 6, 1960  6 Sheets-Sheet 3
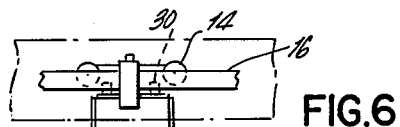
FIG. 6
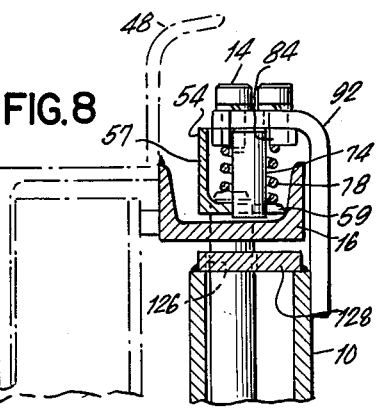
FIG. 8
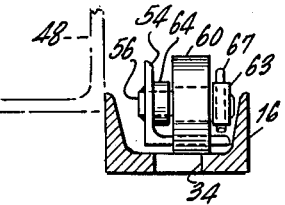
FIG. 11
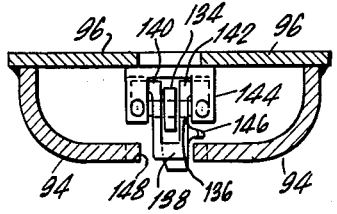
FIG. 16
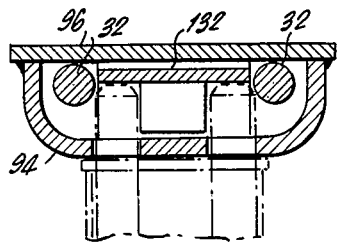
FIG. 15
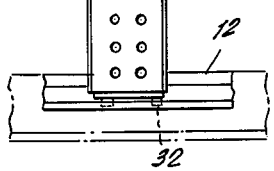
INVENTOR.
GERD RUNKEN
BY
Robert A. Shields
ATTORNEY July 2, 1963   G. RUNKEN   3,095,830
LADING BRACING ARRANGEMENT
Filed July 6, 1960   6 Sheets-Sheet 4
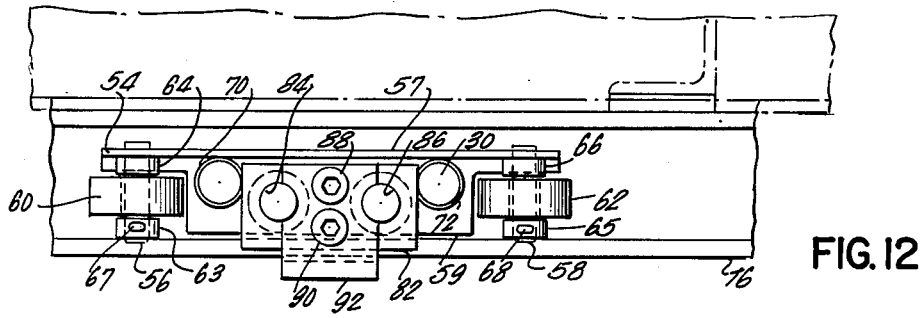
FIG. 12
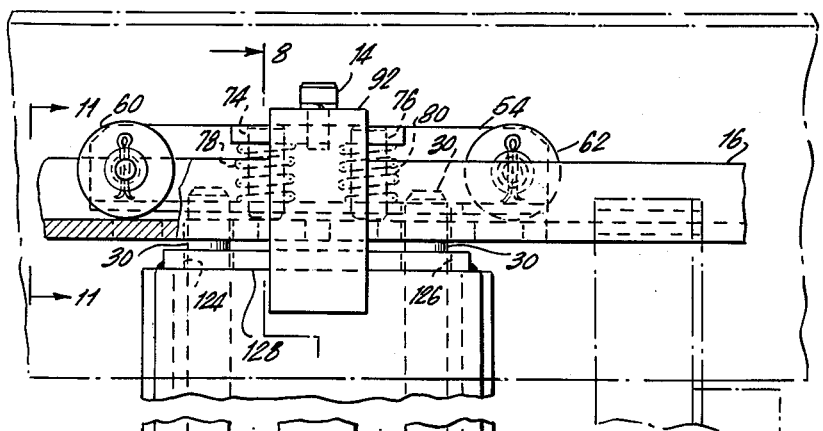
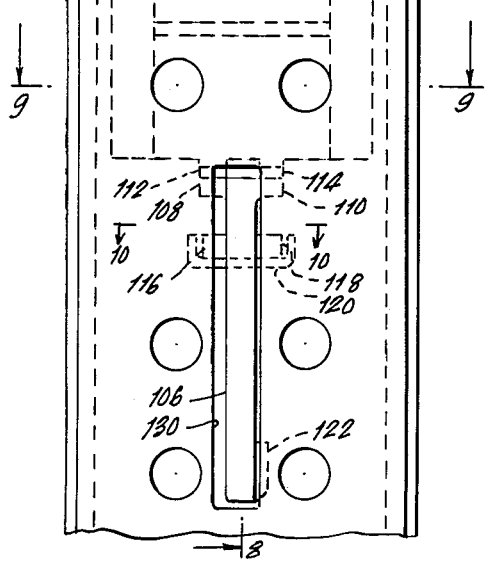
FIG. 7
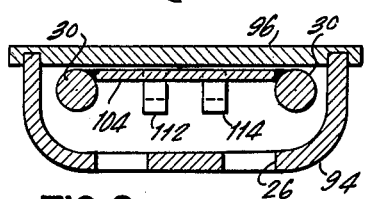
FIG. 9
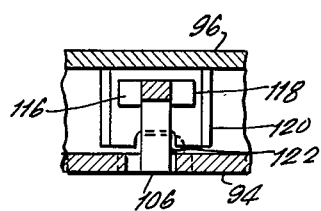
FIG. 10
INVENTOR.
GERD RUNKEN
BY
Robert A. Shields
ATTORNEY

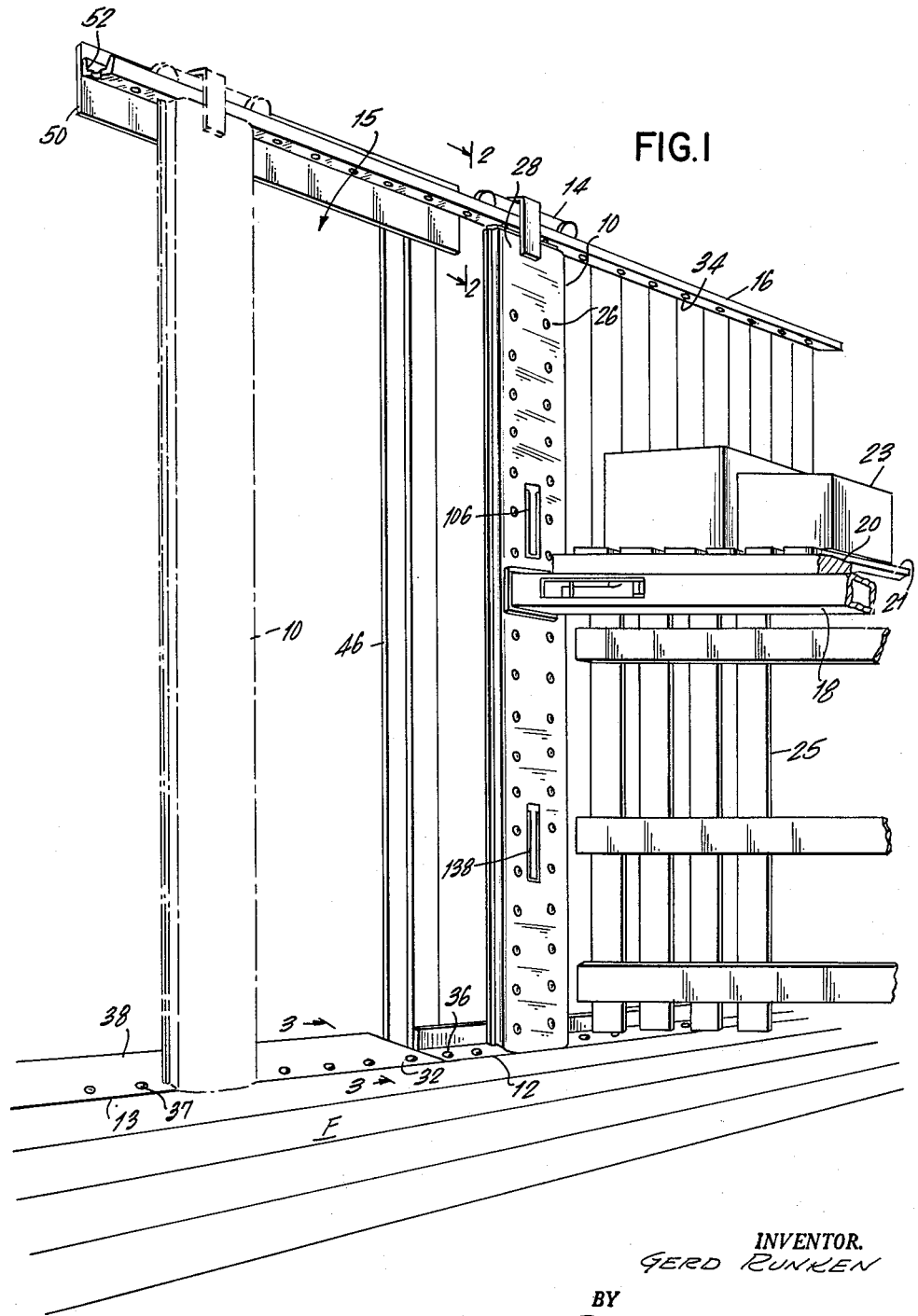

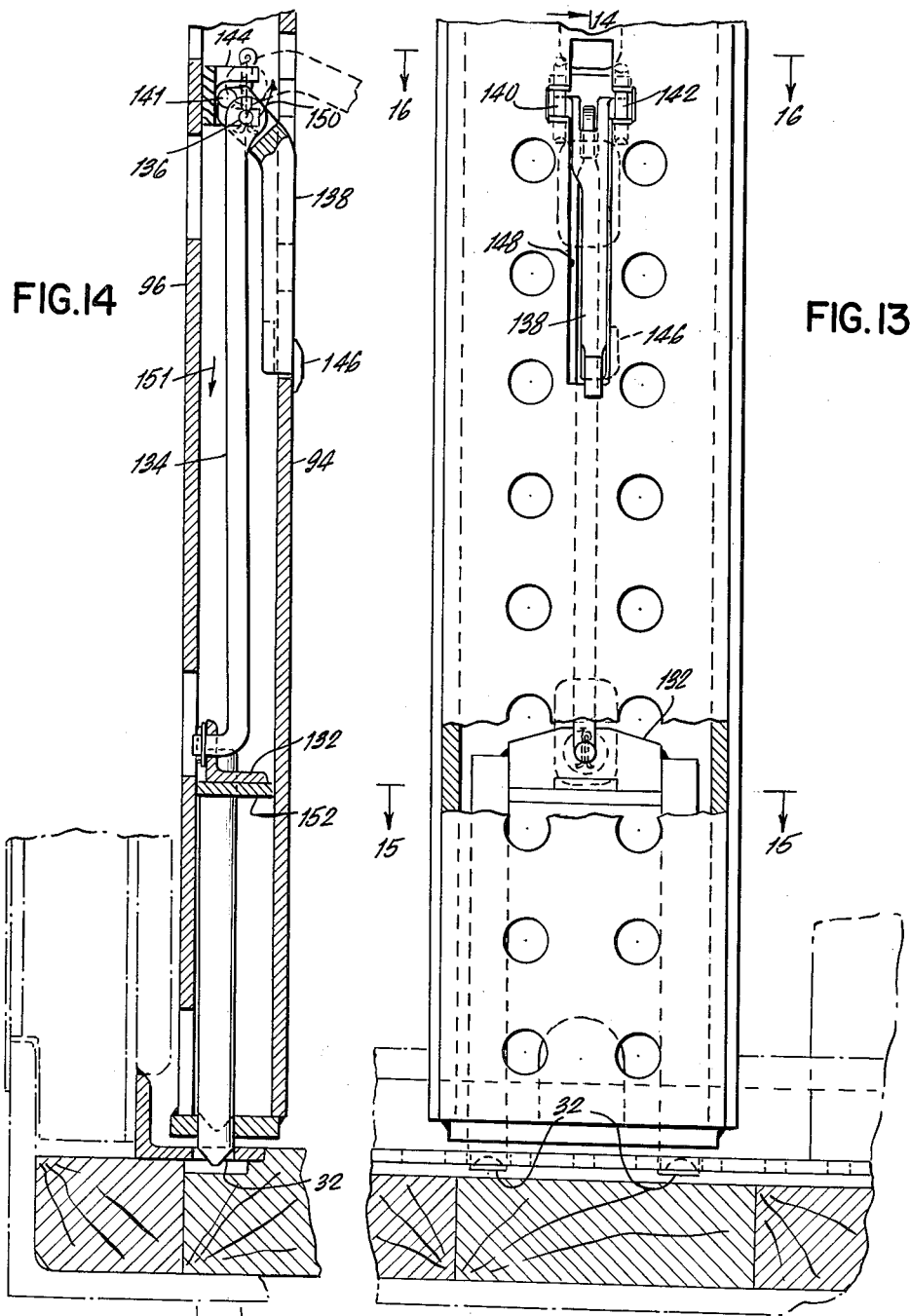

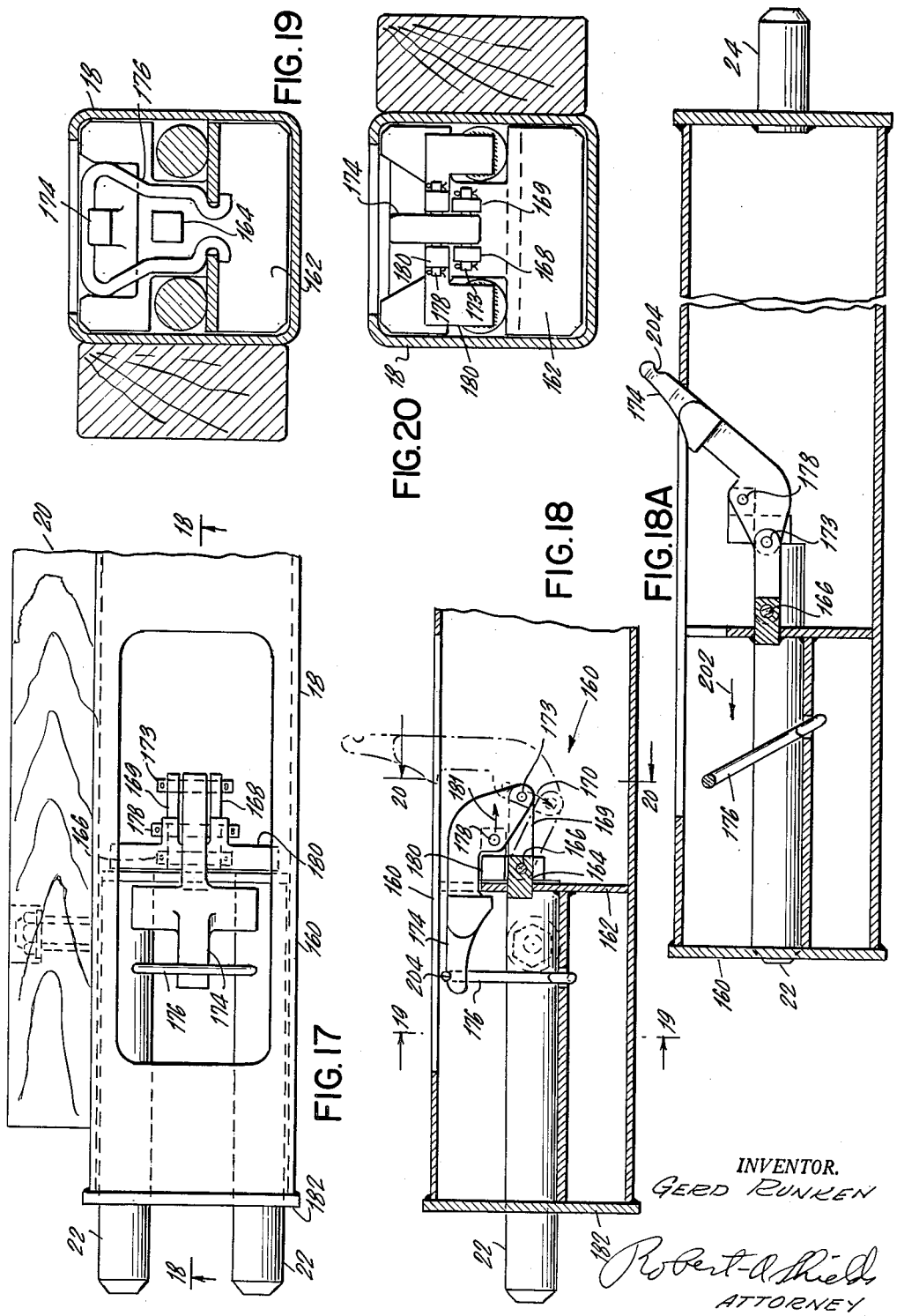

United States Patent Office 3,095,830
Patented July 2, 1963

3,095,830
LADING BRACING ARRANGEMENT
Gerd Runken, Cold Springs, N.Y., assignor to ACF Industries, Incorporated, New York, N.Y., a corporation of New Jersey
Filed July 6, 1960, Ser. No. 41,157
4 Claims. (Cl. 105—369)

This invention relates to bracing equipment, and more particularly to portable adjustable lading bracing apparatus.

In bracing equipment for lading presently available, the structures are heavy, expensive, and lack adjustability. Also excessive bracing structures must be provided throughout a freight vehicle to take care of all conditions even though most of the structures in the vehicle are seldom used for the bracing of lading. In most instances the bracing structures are not readily adaptable to changing conditions thus adding to the cost of shipping.

It is the purpose of this invention to provide means of bracing the lading with a portable adjustable bracing apparatus, capable of a high degree of mobility and adaptability within a freight vehicle with a minimum amount of manual labor.

It is an object of this invention to provide a simple adjustable lading bracing apparatus requiring a minimum number of loose parts and so constructed that it may be easily removed to release the freight vehicle for normal usage.

Another object of this invention is to provide a bracing structure that is portable and versatile in its adaptability as a support, or blocking for freight or lading within a vehicle.

A further object of this invention is to provide a brace which may be readily positioned across the doorway of railway cars to thereby act as lading retainers at the doorway.

An additional object of this invention is to provide brace structures that may be used to support or brace lading at any point along the entire longitudinal length and width of a freight vehicle.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

FIGURE 1 is a perspective view of a bracing apparatus in accordance with a preferred embodiment of the invention;

FIGURE 2 is a sectional view of the bracing apparatus taken on line 2—2 of FIGURE 1;

FIGURE 3 is a sectional view of the bracing apparatus taken on line 3—3 of FIGURE 1;

FIGURE 4 is a fragmentary sectional view of the bracing apparatus taken at a lower corner of a railway car and illustrating the installation of a lower longitudinal support in either new or existing railway cars;

FIGURE 5 is a fragmentary sectional view of the bracing apparatus taken on a line as shown in FIGURE 3, illustrating installation of a lower longitudinal support but of a modified form to incorporate the invention in existing railway cars;

FIGURE 6 is a vertical view of a crossbar support or movable post adaptable for use in the present invention;

FIGURE 7 is a large scale fragmentary view, partly in section showing a detail of the upper portion of the crossbar support post;

FIGURE 8 is a sectional view taken on the line 8—8 of FIGURE 7;

FIGURE 9 is a sectional view taken on the line 9—9 of FIGURE 7;

FIGURE 10 is a sectional view taken on line 10—10 of FIGURE 7;

FIGURE 11 is a view, partly in section taken on line 11—11 of FIGURE 7;

FIGURE 12 is a plan view of a trolley assembly of the crossbar support post of FIGURE 7;

FIGURE 13 is a vertical view partly broken away, showing details of the lower portion of the crossbar of FIGURE 7;

FIGURE 14 is a sectional view taken on line 14—14 of FIGURE 13;

FIGURE 15 is a sectional view taken on line 15—15 of FIGURE 13;

FIGURE 16 is a sectional view taken on line 16—16 of FIGURE 13;

FIGURE 17 is a plan view of a freight or lading bracing crossbar for use in the present invention;

FIGURE 18 is a sectional view taken on the line 18—18 of FIGURE 17;

FIGURE 18A is a sectional view as shown in FIGURE 18 but with some of the parts re-disposed and showing the other end of the crossbar;

FIGURE 19 is a sectional view taken on line 19—19 of FIGURE 18;

FIGURE 20 is a sectional view taken on the line 20—20 of FIGURE 18; and

FIGURE 21 is a vertical view of a portion of the post shown in FIGURE 6 showing a modification of retainer holes with the adjustability features of the crossbar.

In carrying the invention into effect in the embodiment which has been selected for illustration in the accompanying drawings and for description in this specification and referring now particularly to FIGURE 1, an adjustable freight or lading bracing apparatus such as a crossbar support or movable post 10 is supported by a lower longitudinal member or support 12 and a movable floating support or hanger such as a trolley or carriage 14 supported on an upper longitudinal member such as a rail or track 16. The movable hanger 14 need not be a trolley or a carriage but may be any slidable resilient support on which the movable post 10 may hang.

Removably secured on, and traversely bridging two of the posts 10 is a crossbar 18 on which is attached a wooden beam 20. The beam 20 in turn supports horizontally extending beams 21 on which is vertically supported freight or lading 23. In addition, crossbar 18 braces vertical extending beams 25 to brace lading or freight in a forward or aft direction. The crossbar 18 is provided with retaining pins 22 and 24, as shown in FIGURES 17, 18 and 18A which are receivable in any number of perforations or retaining holes 26 provided along vertical surface 28 of the post 10. Similarly, upper retaining pins 30 of post 10 as shown in FIGURES 6, 7 and 13, are received in track retainer holes 34 in the track 16 while lower pins 32 engage in retainer holes 36 in the longitudinal support 12. At this time it may be noted that the longitudinal support 12 as shown in FIGURE 4 extends across the doorway opening 15 by fastening it to a plate 13 welded to a threshold plate 38 of the existing cars, as shown in FIGURE 5.

The door plate 13 is provided with retainer holes 37 in which the retaining pins 32 of the post 10 are received. In new railway cars the threshold plate 38 extends further into the railway cars to form the longitudinal support 12 and retainer holes 39 may be supplied in line with the retainer holes 36. In this case, holes 40 in the floor 42 of the railway car, below the retainer holes 39, are provided in which the retainer pins 32 of the post 10 are received. The side sill 44 and the fixed posts such as 46 of the railway car provide the base support on which the longitudinal support 12 is supported.

The track 16 of channel form, is attached in any suitable manner to the plate 48 of the railway car. Across the upper area of the railway car door opening 15 is located a reinforcement plate 50 to which the track 16 is welded as at 52 by removing the outer flange of the channel form track 16. In this respect the movable post 10, as shown in phantom in FIGURE 1, may travel or be secured at the doorway opening 15 as well as at any place in the car.

Referring specifically to FIGURES 6 to 12 the carriage 14 is shown with the post 10 supported thereon, locked in position by the retainer pins 30 within the track 16 and the retainer pins 32 within the longitudinal support 12. The carriage 14 comprises an elongated angle iron structure 54 having a pair of axles 56 and 58 extending horizontally from one leg 57. Rollers 60 and 62, which support the carriage 14 on the track 16 are mounted on the axles 56 and 58, respectively, retained thereon by side bearings 63, 64, 65 and 66. Cotter pins 67 and 68 lock the rollers 60 and 62 in rotatable position on the axles 56 and 58. The other or horizontal leg 59 of the angle iron 54 is provided between the rollers 60 and 62 with two carriage retainer holes or openings 70 and 72. The longitudinal centerline of the retainer holes 70 and 72 is directly above the longitudinal centerline of the retainer holes 34 of the track 16 when the carriage 14 and post 10 is in locked position.

On the horizontal leg 59 of the angle iron 54 is a resilient support such as a welded pair of upwardly extending pins 74 and 76, axially supporting floating springs 78 and 80. The springs are held in this position by plate 82 in which are located pin alignment holes 84 and 86 co-axially located with the centerline of the pins 74 and 76. The plate 82 also is tapped and into which bolts 88 and 90 are threaded to support post 10 through an angle hanger bracket 92.

The angle hanger bracket 92 supports the post 10 through a front plate 94. The front plate 94 is of curved U-shape and has the flange edges attached to a back plate 96 to form the generally box-shaped movable post 10. The front plate 94 includes a plurality of retainer holes 26 to provide supports for the retainer pins 22 and 24 of the crossbar 18 as hereinafter more fully described.

Within the post 10 is located a pair of post retainer pins 30 connected to and supported by a spacer or crosshead 104. The pins 30 are held in an upwardly extended position by a handle 106 when such handle is in the lower locked position. As best seen in FIGURES 7 and 8, the handle 106 has trunnions 108 and 110 that engage the lower cam like members or lugs 112 and 114 of the crosshead 104. Integral to the handle 106 are another pair of trunnions 116 and 118 that are slidably retained by a channel or ledge 120 welded to the plate 96 (see FIGURE 10). The handle 106 being locked in position by an extension 122 on the lower end thereof to keep the pins 30 locked in the track retainer holes 34 through the bearing holes 124 and 126 located in an upper plate 128 of the post 10 and protruding within the carriage retainer holes 70 and 72. When it may be necessary to relocate the post 10, the handle 106 is pushed to one side, to allow the extension 122 to clear an opening 130 located in the front plate 94, and to be pulled upwardly, as shown in phantom in FIGURE 8, permitting the crosshead 104 with the pins 30 to drop and to unlock the carriage 14 and post 10 from the track 16. Thus it will be seen that the locked handle is recessed within the movable post to avoid damage yet is readily accessible for quick operation.

FIGURES 13 to 16 show the lower portion of the post 10, in which is located a pair of lower post retainer pins 32. The pins 32 are connected to a spacer 132 to which is rotatably attached a locking rod 134. The lock rod 134 in turn is connected to a horizontally extending pin 136 which is rotatably connected to a handle 138. The handle 138 carrying the lock rod 134 pivots about its trunnions 140 and 142 at pivot 141, within a supporting bracket 144 welded to plate 96. To unlock the lower portion of the post 10 the handle 138 is pushed to one side to allow an extension 146 to pass through an opening 148 located in the front plate 94. The handle 138 is then pulled upward rotating about pivot 141 to the phantom position in FIGURE 14, carrying the locking rod 134 upwardly as shown by arrow 150. To lock the post 10 in the longitudinal support 12, the handle 138 is pushed downwardly rotating about pivot 141 to carry the lock rod 134 down as shown by arrow 151. A stop plate 152 is provided to stop the spacer 132 thus preventing the retaining pins 32 from overriding their locked positions in the retainer holes 36 or 37.

FIGURES 17 to 20 show the crossbar 18 with stationary retaining pins 24 at one end and axially movable retaining pins 22 at the other end. The pins 22 and 24 may be received in the retaining holes 26 of the front plate 94 of the post 10 to support the crossbar 18. Within the crossbar 18 is located a lock assembly 160 comprising a plate 162 on which is welded a bracket 164. On the bracket 164 is rotatably attached at a pivot pin 166, two spaced parallel links 168 and 169. The links 168 and 169 rotate about pivot pin 166 in the direction shown by arrow 170 to the phantom position in FIGURE 18.

At the other end of links 168 and 169, away from the pivot pin 166, is rotatably attached at another pivot pin 173 a lock release handle 174. The handle 174 may also be held in a locked position by a second spring lock 176. At another pivot pin 178 is pivotally attached a longitudinally movable bracket 180 on which is welded the pair of retaining pins 22. The pins 22 are held in the longitudinally movable position by plate 162 and a crossbar end plate 182 welded to the crossbar. The crossbar 18 may be provided with the wooden beam 20 to increase bracing versatility and usefulness.

To provide for a closer space increment adjustment the crossbar support post 10 may be provided with an additional central vertical line of retainer holes 186 as shown in FIGURE 21. In this respect the crossbar pins 22 and 24 may be inserted in any set of spaced longitudinal or vertical retainer holes to provide increment adjustment towards longitudinal or vertical direction. The crossbar may be positioned, as shown at 188 in FIGURE 21, with the beam 20 facing to the right or may be rotated 180 degrees from this position to a position, as shown at 190, with the beam 20 facing to the left or may be rotated 90 degrees from this position to a position, as shown at 192, with the beam 20 facing upwardly. It can be noted, that the retainer holes 26 and 186 may be spaced in any predetermined diagonal, horizontal or vertical direction to permit incremental bracing in longitudinal and vertical directions as well as any intermediate directions.

The operation of the invention is as follows: to move the post 10 to any desired bracing position, the handle 138 of the post 10 is pushed sideways for the extension 146 to by-pass the opening 148. The handle 138 is then free to rotate upwardly, pulling lock rod 134 and pins 32 up and out of the retaining holes 36 or 37 releasing the lower end of the post 10.

To release the upper end of the post 10 to permit movement of the post, the handle 106 is moved sideways for the extension 122 to clear the opening 130. The handle 106 is then free to rotate upwardly. The trunnions 116 and 118 of the handle 106 will slide on the ledge 120 as they rotate with the handle 106 to rotate the upper trunnions 108 and 110 to their lower most position on ledge 120. The spacer 104 will drop with the retainer pins 30 to unlock the carriage from the track 16. Post 10 is now free to be moved along the track 16 by carriage 14 to any desired location within the railway car. If desired, the entire post 10 may be removed and placed on another side of the railway car or may be placed in any railway car having similar track and longitudinal supports merely by removing stud bolts 88 and 90.

The post 10 with the carriage 14 attached can be locked in the new position on track 16 by aligning pins 30 with any two of the retainer holes 34 located in the track 16. The handle 106 is then rotated downwardly and sideways until the projection 122 is inserted in opening 130.

The lower portion of the post 10 may be locked in place by raising handle 138 to permit pins 32 to be aligned with a pair of retainer holes 36 or 37 in the longitudinal support 12 depending on the desired location. When the pins 32 are aligned the handle 138 is pulled downwardly and sideways to permit the projection 146 to be inserted in opening 148 to lock the handle 138 in place. The post 10 is now in a position to receive the crossbar 18. It can be noted at this point that the post is resiliently supported on the carriage 14 by springs 78 and 80 and any vertical loads received by the crossbar to the post will be transmitted to the longitudinal support 12 without injecting any load on the carriage 14 and track 16.

Since pins 24 of the crossbar 18 are stationary they are first inserted into a pair of retainer holes located on one side of the railway car. The retainer holes in which the stationary pins 24 are inserted may be located on another properly positioned post 10.

When the stationary pins 24 are inserted in one side of a railway car the handle 174 of the crossbar 18 should be in the position as shown in FIGURE 18A. Next the movable retainer pins 22 are lined up with a pair of retainer holes 26 of the post 10 that are longitudinally opposite to the retainer holes within which the stationary pins 24 have been inserted. The pins 22 are then locked into the retainer holes by rotating the handle 174 towards the retainer holes driving the retainer pins in the direction shown by arrow 202 of FIGURE 18A.

When the handle 174 is inserted within the crossbar 18 as shown in solid lines in FIGURE 18, the spring lock 176 is rotated and attached to the indentation 204 located at the end of the handle 174 to double lock the handle 174 in place. The crossbar 18 now forms a strong brace for any horizontal or vertical loading, by itself or by utilizing the extending beams 21 and 25. It can be noted again that once the crossbar 18 is loaded and the load transferred to the post 10, the floating springs 78 and 80 will be compressed until the bottom of post 10 contacts the longitudinal support 12, and in turn, be supported by the railway structure itself. The carriage 14 does not carry any of the load that the crossbar 18 and the post 10 is subjected to.

The invention hereinabove described may therefore be varied in construction within the scope of the claims, for the particular device selected to illustrate the invention is but one of many possible embodiments of the same. The invention, therefore, is not to be restricted to the precise details of the structure shown and described.

What is claimed is:

1. An apparatus for supporting lading in a railway car having side walls and an underframe, said apparatus including a track supported along the upper longitudinal edge of a side wall, a longitudinally extending support extending along the bottom of said side wall, a carriage, a pair of spaced rollers mounting said carriage on said track for longitudinal movement therealong, a load supporting post member positioned between said track and said longitudinal support, said post member including an upwardly projecting angle bracket having a portion extending above and overlying said carriage, resilient means mounted on said carriage and interposed between the overlying portion of said post angle bracket and the carriage for suspending the post out of engagement with the longitudinally extending support when the post is not under load but permitting the post to move downwardly into engagement with the longitudinal support when supporting a load, means securing said resilient means against lateral displacement, a retainer plate overlying said resilient means, means for detachably connecting the overlying portion of said post with said retainer plate, and manually actuated means mounted on said post for engaging the track and carriage to prevent relative movement of the parts.

2. An apparatus for supporting lading in a railway car having side walls and an underframe, said apparatus including a track supported along the upper longitudinal edge of a side wall, a longitudinally extending support extending along the bottom of said side wall, a carriage, a pair of spaced rollers mounting said carriage on said track for longitudinal movement therealong, a load supporting post member positioned between said track and said longitudinal support, said post member including an upwardly projecting angle bracket having a portion extending above and overlying said carriage, spaced pin members fixed to and extending upwardly from said carriage, springs mounted on said pins, a spring retaining plate overlying said spring means, spaced openings in said retainer plate for the passage of said pins therethrough, means detachably securing the overlying portion of said angle bracket to said spring retaining plate for supporting said post by said springs out of engagement with the longitudinally extending support when the post is not under load but permitting the post to move downwardly into engagement with the longitudinal support when supporting a load, and manually actuated means mounted on the post for engaging the track and carriage to prevent relative movement of the parts.

3. An apparatus for supporting lading in a railway car having side walls and an underframe, said apparatus including a track supported along the upper longitudinal edge of a side wall, a longitudinally extending support extending along the bottom of said side wall, a carriage, a pair of spaced rollers mounting said carriage on said track for longitudinal movement therealong, a load supporting post member positioned between said track and said longitudinal support, said post member including an upwardly projecting angle bracket having a portion extending above and overlying said carriage, resilient means mounted on said carriage and interposed between the overlying portion of said post angle bracket and the carriage for suspending the post out of engagement with the longitudinally extending support when the post is not under load but permitting the post to move downwardly into engagement with the longitudinal support when supporting a load, means for securing said resilient means against lateral displacement, means for detachably connecting the overlying portion of said post with said resilient means, and manually actuated means projecting from the post through the track and carriage to prevent relative movement of the parts.

4. The structure of claim 3 characterized in that the track and carriage have openings which may be brought into registry and the manually actuated means includes pins which are projected through the openings in the track and carriage when in registry to secure the parts against relative movement.

References Cited in the file of this patent

UNITED STATES PATENTS

| | | |
|---|---|---|
| 1,586,783 | Coffey | June 1, 1926 |
| 2,220,436 | Ziegler | Nov. 5, 1940 |
| 2,227,807 | Dixon | Jan. 7, 1941 |
| 2,324,721 | O'Connor | July 20, 1943 |
| 2,474,563 | Wieden et al. | June 28, 1949 |
| 2,520,969 | Holdeman | Sept. 5, 1950 |
| 2,546,929 | Nampa | Mar. 27, 1951 |
| 2,603,167 | Webster et al. | July 15, 1952 |
| 2,808,789 | Stough | Oct. 8, 1957 |
| 2,820,667 | Benaroya et al. | Jan. 21, 1958 |
| 2,901,987 | Campbell et al. | Sept. 1, 1959 |
| 3,017,843 | Loomis et al. | Jan. 23, 1962 |
| 3,018,741 | Loomis et al. | Jan. 30, 1962 |